IMPEDANCE GATE

Filed Dec. 19, 1958

INVENTOR
CRAVENS L. WANLASS

BY HIS ATTORNEYS
HARRIS, KIECH, FOSTER & HARRIS

United States Patent Office 3,088,039
Patented Apr. 30, 1963

3,088,039
IMPEDANCE GATE

Cravens L. Wanlass, Woodland Hills, Calif., assignor, by mesne assignments, to Ford Motor Company, Dearborn, Mich., a corporation of Delaware Filed Dec. 19, 1958, Ser. No. 781,535
5 Claims. (Cl. 307—88)

This invention relates to control circuits or gates and, in particular, to a gate circuit for providing a variable, controlled impedance suitable for use in computers, memory units, and the like.

It is an object of the invention to provide a gate unit which may be connected into a circuit with the gate unit having means for controlling the impedance thereof and, hence, the impedance of the circuit. A further object is to provide such a gate unit wherein the impedance may be varied between a relatively low value and a relatively high value by simply changing the bias current in the gate unit. A further object of the invention is to provide a gate unit which can be used to control the coupling of pulses from a driver or pulse source to a group of magnetic core memory units or the like.

It is an object of the invention to provide an impedance gate which is simple in construction and operation, inexpensive to manufacture and rugged and durable. A further object is to provide such an impedance gate which utilizes orthogonal magnetic fields in a piece of magnetic material to provide the desired control.

It is an object of the invention to provide an impedance gate comprising a block of magnetic material with variable impedance and control current conductors passing therethrough spaced from and perpendicular to each other and with a third conductor passing through the block adjacent the control current conductor, the third conductor being a shorted turn winding. A further object of the invention is to provide such a gate wherein a rectifier may be included in the shorted turn winding to provide a polarity control on the impedance gate.

It is a further object of the invention to provide an impedance gate which can be manufactured in the same manner as the gating circuits of my copending application entitled "Logic System Gating Circuit," Serial No. 689,622, filed October 11, 1957. Another object of the invention is to provide an impedance gate which can be operated in conjunction with a plurality of similar gates in the same manner as the gating circuits of the aforesaid copending application.

Other objects, advantages, features and results of the invention will more fully appear in the course of the following description. The drawing merely shows and the description merely describes preferred embodiments of the present invention which are given by way of illustration or example.

Figure 1:
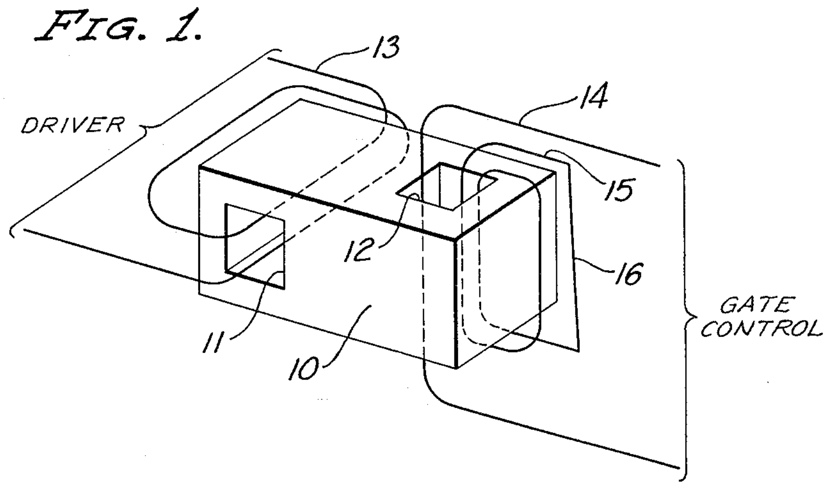
FIG. 1 is an isometric view of a preferred form of the impedance gate of the invention.

The impedance of FIG. 1 includes a block 10 of magnetic material having orthogonal openings 11, 12 therethrough. The particular type of material utilized is not critical, but it should have sufficient hysteresis characteristics such that magnetic retentivity is present. The ferrite materials presently available are suitable from the manufacturing view and provide satisfactory operation of the impedance gate.

A conductor 13, which may be referred to as the variable impedance conductor, is positioned in the opening 11. Another conductor 14, which may be referred to as the control or bias current conductor, is positioned in the opening 12. A third conductor 15 is also positioned in the opening 12, this conductor having a shorting connection 16 across the ends thereof. It should be noted that while the conductors 13 and 15 are shown as two-turn windings and the conductor 14 is a single-turn winding, there is no required relation between the number of turns. The particular number of times a conductor passes through an opening is dependent upon the specific application of the unit, a single turn providing the fastest operating time and having the largest current requirements. Conversely, conductors making a large number of turns will produce limited operating speeds while requiring smaller currents for proper operation.

Figure 2:
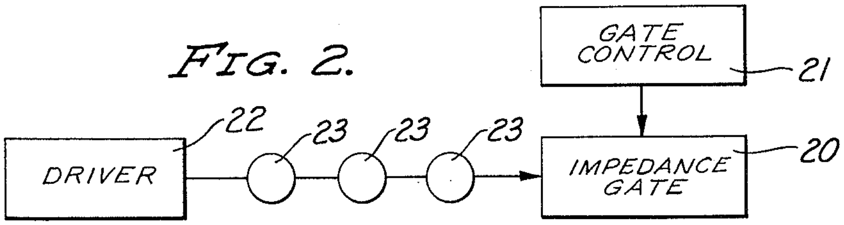
FIG. 2 is a block diagram of a circuit utilizing the impedance gate of the invention.

The digram of FIG. 2 illustrates one manner of using the impedance gate of FIG. 1. An impedance gate 20 has a gate control unit 21 connected to the control current conductor 14 for providing a bias or control current in the conductor 14. A driver unit 22 is connected to the variable impedance conductor 13 through one or more driven units 23. In a typical installation, the driven units will comprise magnetic core memory devices and the driver unit will produce a train of current pulses, some of which are to be coupled to the driven units. When the impedance gate presents a low impedance to the variable impedance conductor, the current pulse from the driver unit will pass through the driven units. However, when the impedance gate presents a high impedance to the variable impedance conductor, there will be no or a relatively small current pulse coupled to the driven units.

In the operation of the impedance gate, the high impedance condition is achieved by operating the gate control unit 21 to provide a control current in the control current conductor 14 which will maintain the magnetic material around the axis of the control current conductor in the zero or near zero flux or magnetic induction state. This zero flux state corresponds to point 26 or point 27 on the hysteresis curve of FIG. 3, the position along the magnetomotive force of H axis depending upon the prior flux condition of the material. With the zero flux state around the control current axis, the variable impedance conductor is equivalent to a high impedance inductor and presents the desired high impedance to the driver unit when connected thereto.

For the low impedance condition, the control current from the gate control unit is changed to provide either a positive or negative magnetic induction or flux in the magnetic material around the control current axis. The control current is preferably of a magnitude to produce flux saturation in order to obtain the maximum impedance change. In this state, the impedance gate presents a low impedance to units connected to the variable impedance conductor 13. A current pulse on the conductor 13 will couple energy through the flux field around the control current axis to the shorted turn conductor 15. The low impedance of the shorted turn conductor will be reflected back to the variable impedance conductor providing the desired low impedance conditions.

If the conductor 13 was not disposed orthogonal or substantially orthogonal to the conductor 15, there would be conventional transformer coupling of energy between these conductors when zero flux was present around the conductor 15 and, hence, no high impedance condition could be provided. It should be noted that this gate acts on a lack of magnetic flux to prevent coupling and not a saturation of the magnetic material as used in a saturable reactor. Consequently, much less control current and, therefore, control power is required in the impedance gate than in the saturable reactor or similar device. In addition, much better magnetic isolation is provided in the impedance gate of the present invention than in the conventional saturable reactor.

The impedance change between the high impedance condition and the low impedance condition is a function of the magnitude of the flux change around the conductor 15 and, therefore, it is preferred to have a zero flux state for the high impedance condition and a saturation flux state for the low impedance condition. Of course, the impedance gate unit would function in the same manner but less effectively with lesser flux changes.

The minimum impedance presented by the impedance gate when in the low impedance condition will be a function of the impedance of the shorted turn conductor 15. Therefore, while the shorting connection 16 does not have to be a direct connection with substantially zero resistance, it is preferably thus in order to obtain the least possible impedance. However, where desired, a small resistor may be inserted to serve as a current limiting device or to control the magnitude of the minimum impedance of the unit. Therefore, references in the specification and claims to an approximately zero resistance in the shorted turn conductor are intended to indicate that the minimum resistance compatible with particular circuit applications is being used.

Ordinarily, the gate control unit 21 will provide a direct current to the conductor 14 with the magnitude of the current being changed when it is desired to change the impedance condition of the gate. However, A.C. or pulse control current can be used if desired, it being necessary that the current pulse of proper magnitude be applied to the control current conductor prior to and during the time the pulse from the driver unit is connected to the variable impedance conductor so that the desired flux state exists during the existence of the driver pulse. It should also be noted that it is preferred to use non-square loop magnetic material in the impedance gate as this places less stringent requirements on the magnitude of the control current required to maintain the zero flux state.

Figures 3, 4:
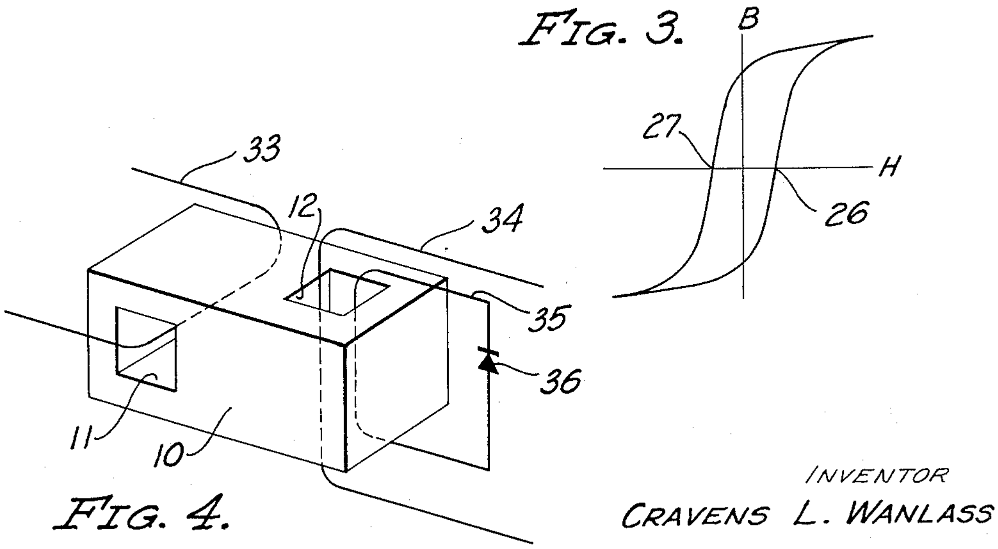
FIG. 3 is a hysteresis loop used in illustrating the operation of the invention.
FIG. 4 is an isometric view of an alternative form of the invention.

In the alternative embodiment of FIG. 4, a variable impedance conductor 33 is positioned in the opening 11 and a control current conductor 34 and a third conductor 35 are positioned in the opening 12. In this particular embodiment, both the conductors 33 and 35 are shown as single turn windings. However, as discussed above, the particular number of turns is not pertinent to the invention. A rectifier element 36 is connected across the conductor 35, which rectifier element provides a zero or low impedance to currents of one polarity in the conductor 35 and a high impedance to currents of the opposite polarity. Hence, the rectified element 36 functions in the same manner as the shorting connection 16 of the embodiment of FIG. 1 with current pulses of one polarity on the conductor 33. However, for current pulses of the opposite polarity on the conductor 33, the impedance gate presents a high impedance regardless of the flux state around the control current axis since there is effectively no shorted turn. This permits the impedance gate of the invention to be made polarity sensitive when desired for specific circuit applications.

It should be noted that the impedance gate of the present invention may be manufactured according to any of the methods and in any of the forms shown in my copending application Serial No. 689,622. Although exemplary embodiments of the invention have been discussed and disclosed, it will be understood that other applications of the invention are possible and that the embodiments disclosed may be subjected to various changes, modifications and substitutions without necessarily departing from the spirit of the invention.

I claim as my invention:

1. In a circuit for controlling the impedance presented to a drive current source, the combination of: a unitary block of magnetic material having drive and control current axes therethrough substantially perpendicular to each other, and including a first flux path about the drive current axis, and a second flux path about the control current axis perpendicular to the first flux path; a variable impedance conductor positioned along said drive current axis for coupling to the drive current source; a control current conductor positioned along the control current axis; a third conductor positioned along the control current axis, with a closed circuit having approximately zero resistance in at least one direction connected across the third conductor; and a control current source for generating a current in the control current conductor to produce a magnetic flux in said second path for selectively setting the magnetic induction state in the second path at substantially zero and at a high value with the high induction state providing coupling of the closed circuit impedance of the third conductor to the variable impedance conductor and with the zero induction state preventing such coupling and producing a high impedance to current in said variable impedance conductor.

2. In a circuit for controlling the impedance presented to a drive current source, the combination of: a unitary block of magnetic material having drive and control current axes therethrough substantially perpendicular to each other, and including a first flux path about the drive current axis, and a second flux path about the control current axis perpendicular to the first flux path; a variable impedance conductor positioned along said drive current axis for coupling to the drive current source; a control current conductor positioned along the control current axis; a third conductor positioned along the control current axis, said third conductor being a portion of a shorted winding having substantially zero resistance; and a control current source for generating a current in the control current conductor to produce a magnetic flux in said second path for selectively setting the magnetic induction state in the second path at substantially zero and at a high value with the high induction state providing coupling of the closed circuit impedance of the third conductor to the variable impedance conductor and with the zero induction state preventing such coupling and producing a high impedance to current in said variable impedance conductor.

3. In a circuit for controlling the impedance presented to a drive current source, the combination of: a unitary block of magnetic material having drive and control current axes therethrough substantially perpendicular to each other, and including a first flux path about the drive current axis, and a second flux path about the control current axis perpendicular to the first flux path; a variable impedance conductor positioned along said drive current axis for coupling to the drive current source; a control current conductor positioned along the control current axis; a third conductor positioned along the control current axis; a closed circuit having a rectifier element in series connected across said third conductor; and a control current source for generating a current in the control current conductor to produce a magnetic flux in said second path for selectively setting the magnetic induction state in the second path at substantially zero and at a high value with the high induction state providing coupling of the closed circuit impedance of the third conductor to the variable impedance conductor and with the zero induction state preventing such coupling and producing a high impedance to current in said variable impedance conductor.

4. In a circuit for controlling the impedance presented to a drive current source, the combination of: a unitary block of magnetic material having drive and control current axes therethrough substantially perpendicular to each other with a flux zone therebetween, and including a first flux path about the drive current axis, and a second flux path about the control current axis intersecting and perpendicular to said first flux path in said flux zone; a variable impedance conductor positioned along said drive current axis for coupling to the drive current source; a control current conductor positioned along the control current axis; a third conductor positioned along the control current axis, with a closed circuit having approximately zero resistance in at least one direction connected across the third conductor; and a control current source for generating a current in the control current conductor to produce a magnetic flux in said second path for selectively setting the magnetic induction state in the second path at substantially zero and at a high value with the high induction state providing coupling of the closed circuit impedance of the third conductor to the variable impedance conductor and with the zero induction state preventing such coupling and producing a high impedance to current in said variable impedance conductor.

5. In a circuit for controlling the impedance presented to a drive current source, the combination of: a unitary block of magnetic material having drive and control current openings therethrough substantially perpendicular to each other, and including a first flux path about the drive current opening, and a second flux path about the control current opening perpendicular to and intersecting the first flux path in a zone between said axes; a variable impedance conductor positioned in said drive current opening for coupling to the drive current source; a control current conductor positioned in the control current opening; a third conductor positioned in the control current opening, with a closed circuit having approximately zero resistance in at least one direction connected across the third conductor; and a control current source for generating a current in the control current conductor to produce a magnetic flux in said second path for selectively setting the magnetic induction state in the second path at substantially zero and at a high value with the high induction state providing coupling of the closed circuit impedance of the third conductor to the variable impedance conductor and with the zero induction state preventing such coupling and producing a high impedance to current in said variable impedance conductor.

References Cited in the file of this patent

UNITED STATES PATENTS

| | | |
|---|---|---|
| 1,788,152 | Dowling | Jan. 6, 1931 |
| 2,773,198 | Duinker | Dec. 4, 1956 |
| 2,780,771 | Lee | Feb. 5, 1957 |
| 2,810,901 | Crane | Oct. 22, 1957 |
| 2,811,710 | Demer | Oct. 29, 1957 |
| 2,905,834 | Arsenault | Sept. 22, 1959 |
| 2,907,946 | Hooper | Oct. 6, 1959 |
| 2,939,117 | Brown | May 31, 1960 |
| 2,962,719 | Rajachman | Nov. 29, 1960 |

OTHER REFERENCES

"Nondestructive Sensing of Magnetic Cores," Buch and Frank, Communication and Electronics, pages 822–830, January 1954.